Sept. 19, 1961     H. I. MANDOLF     3,000,586
FISHING REEL
Filed April 21, 1958     2 Sheets-Sheet 1
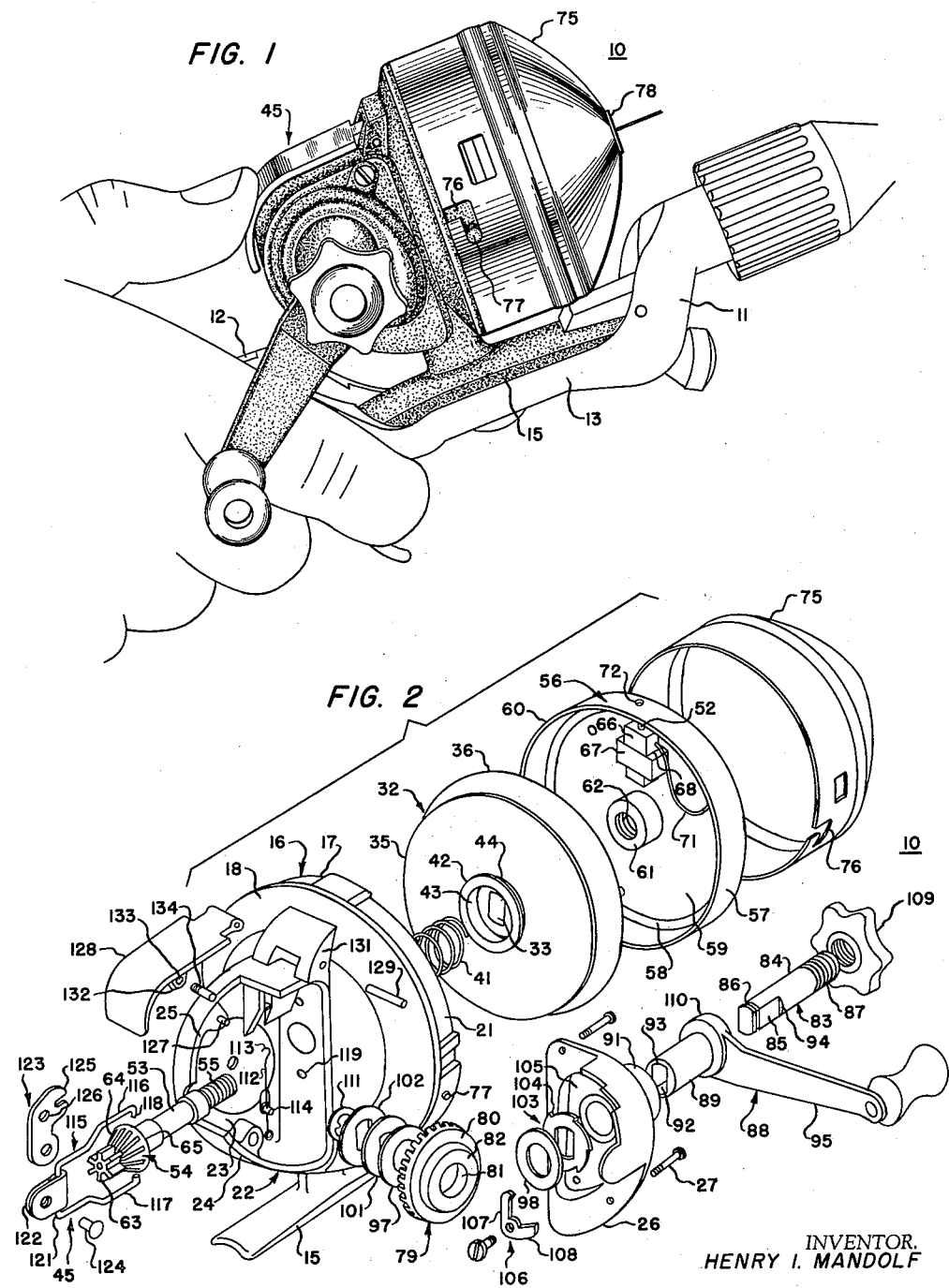
INVENTOR.
HENRY I. MANDOLF
BY
ATTORNEY Sept. 19, 1961     H. I. MANDOLF     3,000,586
FISHING REEL Filed April 21, 1958     2 Sheets-Sheet 2

INVENTOR.
HENRY I. MANDOLF
BY
*Walter J. Jason*
ATTORNEY

United States Patent Office 3,000,586
Patented Sept. 19, 1961

3,000,586
FISHING REEL
Henry I. Mandolf, San Diego, Calif., assignor to Langley Corporation, San Diego, Calif., a corporation of California
Filed Apr. 21, 1958, Ser. No. 729,832
7 Claims. (Cl. 242—84.2)

This invention relates to fishing reels and more particularly casting reels of the spinning type.

An object of the present invention is to provide a fishing reel which fits any conventional fishing rod and which has an improved construction which affords the reel the advantages of spinning with the accuracy of bait casting.

Another object of this invention is to provide a novel form of casting reel of the spinning type wherein the line is accurately guided and easily wound onto a spool and is readily passed from the spool to accomplish casting and which reel embodies improved means for changing the reel from a line winding to a casting condition and vice-versa.

Another object of the invention is to provide a casting reel of the spinning type having improved means, operable by the force of a fisherman's thumb, for setting the line preparatory for casting and for preventing line playout any time after casting thereby to achieve a cast of desired distance.

Another object of the invention is to provide in a casting reel of the spinning type an improved form of brake or drag which is located in the drive system and in a position for convenient and ready adjustment when playing a fish.

A further object of the invention is to provide in a reel of the above type an improved assembly of elements wherein the working parts are enclosed and protected against dirt and grit but wherein access to the spool is easily had to permit ready and convenient replacement of the spool while in the field.

A still further object of the invention is to provide a casting reel of the spinning type which is simple in design and construction; which is economical to manufacture and maintain; which is attractive in appearance and which is efficient in operation providing effective control of the line during casting and during play of a fish.

Other objects and features of the present invention will be readily apparent to those skilled in the art from the following specification and appended drawings illustrating certain preferred embodiments in which:

FIGURE 1 is a side elevational view of the present reel mounted for use on a casting rod;

FIGURE 2 is an exploded view in perspective of the present reel;

Figure 3:
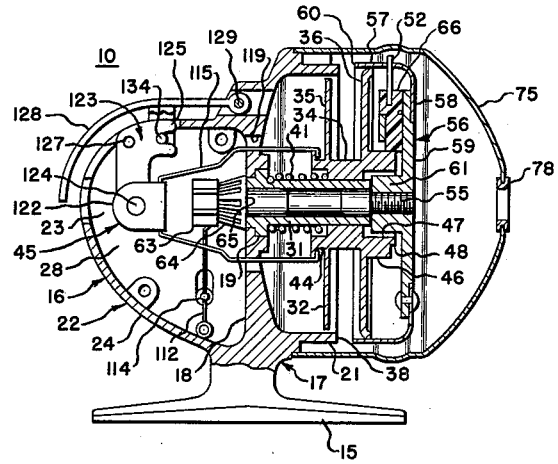
FIGURE 3 is a longitudinal sectional view showing the parts of the reel in line-winding position.
Figure 5:
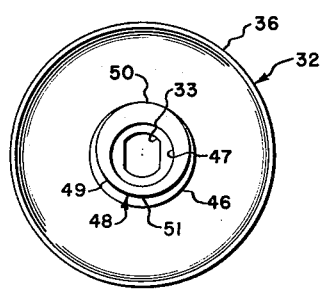
FIGURE 5 is a front elevational view of the line spool.
Figure 4:
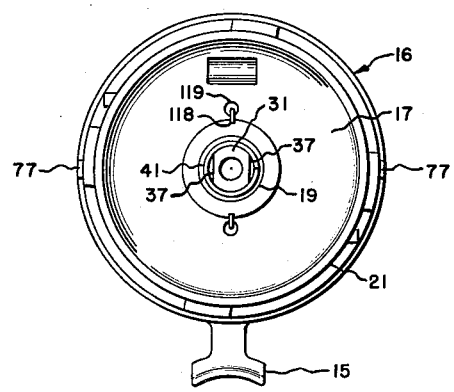
FIGURE 4 is a front elevational view of the housing.
Figure 6:
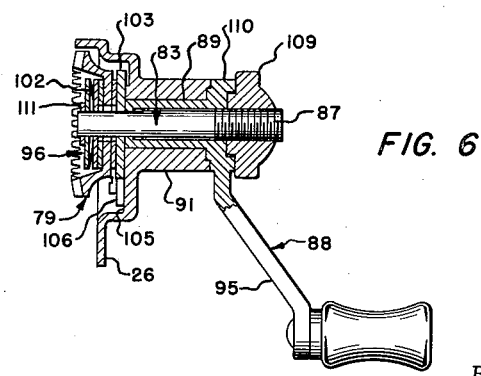
FIGURE 6 is a partial sectional view showing the crank assembly and the driving gear.

Referring now with particularity to the drawings, a fishing reel in accordance with the present invention is designated therein in its entirety by the numeral 10 and in FIGURE 1 is shown mounted upon a conventional fishing rod 11. Rod 11 is conventionally provided with a handle 12 and a reel-seat portion 13 to which a mounting plate 15 of the reel 10 is affixed by conventional means.

Reel 10 comprises a housing 16 having a generally cup-shaped portion 17 comprising an annular base 18 having a central aperture 19 and an annular flange or rim 21. From the rear face of base 18 there rearwardly projects, at generally a right angle, a generally semi-circular, cup-shaped, integral housing portion 22 comprising a base 23 and a generally semi-circular wall 24, wall 24 having an extended opening 25 therein for a purpose to be described. A closure member 26 is removably secured by screws 27 to cup-shaped portion 22 to close the open side thereof, and with portion 22 serves to define a gear chamber 28.

A tubular shaft member 31 is suitably fixedly secured at one of its ends within central aperture 19 of base 18 of housing portion 17 and extends forwardly of base 18. Shaft 31 serves to mount a line spool 32 and extends axially through a central aperture 33 provided in the hub 34 of line spool 32. Line spool 32 comprises the hub portion 34, upon which the fishing line is wound, and a pair of opposed, annular end flanges 35 and 36 between which the fishing line is confined. Shaft 31 is formed with longitudinally extending, oppositely disposed flat faces 37. Spool aperture 33 conforms in its outline to the peripheral outline of shaft 31 whereby when spool 32 is fitted to shaft 31 it will be restrained against rotative movement thereon but will be able to move rectilinearly therealong. Annular flange 35 of spool 32 is of slightly less diameter than the internal diameter of annular flange or rim 21 of housing portion 17 whereby flange 35 and hub 34 may fit within the space defined by annular rim 21. The opposite spool flange 36 is of a sufficient diameter however that a portion of its rear face is engageable with annular edge 38 of rim 21 to pinch the fishing line therebetween at desired times for a purpose to be hereinafter described.

Fitted upon tubular shaft 31 is a coil spring 41 which is held in compression between the front face of base 18 and rear spool flange 35 and serves to normally urge spool 32 outwardly from housing portion 17 to normally space front end flange 36 from edge 38 of rim 21.

Projecting from the rear face of rear spool flange 35 is a concentric, circular body 42 of short length having a central bore 43 in alignment with aperture 33 of spool hub 34 and having an external peripheral groove 44 in its lateral wall surfaces. Groove 44 cooperates with an actuating means 45, later to be described, whereby rectilinear movement of spool 32 may be effected along shaft 31 against the bias of spring 41 to move its forward flange 36 into engagement with edge 38 of housing rim 21.

Provided concentrically on the front face of the forward flange 36 is a boss 46 having a bore 47 in axial alignment with aperture 33 of spool hub 34. Suitably integrally formed on the annular end face of boss 46 is a cam 48 which is so located that its camming run or ledge 49 is eccentrically positioned with respect to the axis of spool 32. This eccentric disposition of cam 48 on the end face of boss 46 is such that the camming run or ledge 49 is aligned with and merges into the lateral wall of boss 46 as at 50. From this point of merger 50, run 49 arcuately slopes away, at both sides, from the lateral wall of boss 46 and at a point 51 directly opposite point 50 lies farthest spaced from such lateral wall. Cam 48 serves to effect return movement of a bail or pick-up pin 52 into its fishing line pick-up position as will be more fully described later.

Journalled through tubular shaft 31 is a rotatable drive shaft 53 having at its inner end a fixed pinion means 54 which lies within chamber 28 of cup-shaped portion 22. The outer end of drive shaft 53 is externally threaded, as at 55 and extends beyond the end of tubular shaft 31 to mount an annular, generally cup-shape cowl 56. Cowl 56 comprises an annular wall or flange 57 and a base 58. Base 58 has an annular opening therein which is closed by a circular plate 59 suitably affixed in position as by riveting. Plate 59 serves to mount bail pin 52, as will be described later.

Projecting from plate 59 of base 58 is a boss 61 having an internally threaded bore 62 which receives threaded shaft end 55 whereby cowl 56 is threadedly affixed to shaft 53 for rotative movement therewith.

Cowl 56 at one end and pinion means 54 at the other end serve to retain drive shaft 53 in its journalled, operative position. The length of shaft 53 is sufficient that boss 61 of cowl 56 will be slightly spaced from the outer end of tubular shaft 31 to provide working clearance.

The fixed pinion means 54 on the inner end of drive shaft 53 includes a usual spur gear 63 and a bevel gear 64 located at the inward side thereof. Bevel gear 64 preferably is made of a suitable plastic material, such as nylon, which will afford very smooth, hard surfaces. With cowl 56 in threaded position, the smooth, circular face 65 of bevel gear 64 will be disposed immediately adjacent the rear face of housing base 18, thus, preventing withdrawal of the shaft 53 in the direction of base 18. As stated above, there is a slight clearance between cowl boss 61 and the outer end of tubular shaft 31, this permits a very slight lengthwise movement of drive shaft 53 so that there will be a minimum of frictional resistance provided to the rotative movement of drive shaft 53.

It is apparent that when cowl 56 is mounted on drive shaft 53 it will be so positioned relative to spool 32 that it will limit the amount of rectilinear movement of spool 32 in that it prevents it from moving rectilinearly off its mount on tubular shaft 31. Coil spring 41, which acts on line spool 32, serves normally to position spool 32 slightly within cowl 56 so that the annular cowl flange 57 extends over and closely adjacent the outer periphery of forward end flange 36 of spool 32, and the fishing line, in its movement onto and off of spool 32, rides upon rim 60 of annular flange 57.

Bail or pick-up pin 52, previously mentioned, is carried by plate 59 of cowl 56 through the agency of a mounting block 67 which is suitably integrally formed on plate 59. Bail block 66, itself, is movably positioned within a through aperture provided in mounting block 67, and is adapted to project portions of its length above and below the upper and lower surfaces of mounting block 67. Bail block 66 is provided with a shoulder 68, which shoulder is adapted to engage a surface of the mounting block 67 to limit the amount of projection of bail block 66 below mounting block 67 and to prevent bail block 66 from passing downwardly through and out of mounting block 67. Mounting block 67 is so located relative to the annular cowl flange 57 that the upper end of the bail block 66 is engageable with flange 57 to prevent bail block 66 from moving upwardly out of mounting block 57. Thus, bail block 66 is freely movable within the support afforded by mounting block 57 but is prevented from moving out of its support by its shoulder 68 and the annular flange 57. A wire spring 71 is suitably supported at one end on the base of cowl 56 and its other end passes through bail block 66. Spring 71 is so bent that its bias serves normally to urge bail block 66 downwardly for engagement of its shoulder 68 with mounting block 67.

Bail or pick-up pin 52 is suitably affixed at the upper end of bail block 66 as by a press fit of the lower end of the pin within an opening in the upper end of bail block 66. Bail pin 52 is adapted to project normal to the axis of the spool through an opening 72 in cowl flange 57 to the exterior thereof where it serves to engage the fishing line for rewinding the line upon spool 32, as will be further fully described. The length of bail pin 52 is such that when shoulder 68 of bail block 66 is in engagement with mounting block 67 pin 52 will be withdrawn into its opening 72 for a purpose to be described.

As stated hereinabove, spool 32 is adapted normally, under the bias of coil spring 41, to extend, for a portion of its width, within cowl 56. In this normal disposition, the face of spool end flange 36 will abut the outer face of mounting block 67 and the lower end of bail block 66 will ride upon the lateral wall surfaces of boss 46 which projects from the front face of forward spool end flange 36. When bail block 66 is riding on boss 46 it will occupy its uppermost position relative to its mounting block 67 so that bail pin 52 will project through opening 72 of cowl flange 57 into line pick-up position. When spool 32 is retracted by actuating means 45, to be described, the amount of retracting movement is sufficient to withdraw boss 46 from beneath bail block 66 so that the bias of wire spring 71 will drop bail block 66 for engagement of its shoulder 68 with mounting block 67. This drop of bail block 66 obviously carries bail pin 52 downwardly from its projecting position and disposes its outer end completely within aperture 72.

To return bail pin 52 to projecting position spool 32 is released from the force actuating means 45 so that coil spring 41 may exert its bias to move spool 32 into cowl 56 until the end of boss 46 engages the face of the portion of bail block 66 which is disposed below mounting block 67. As described previously, the end of boss 46 carries an eccentric cam 48 having a camming run 49. It is camming run 49 which serves to return bail block 66 and its pin 52 to line pick-up position. This is accomplished by rotation of cowl 56 to carry bail block 66 to a position relative to camming run 49 where point 51 of the camming run will slip beneath the end of bail block 66 under the bias of coil spring 41. Now, continued rotation of cowl 56 will cause the bail block 66 to ride along run 49 until it reaches point 50 which merges with the lateral wall of boss 46. The bias of coil spring 41 now pushes the lateral wall of boss 46 beneath the lower end of bail block 66 thereby to maintain it and its pin 52 in line pick-up position. It is apparent that as the lower end of bail block 66 rides on run 49 its opposite end gradually moves toward the annular cowl flange 57 to project pin 52 through aperture 72, and at the time that the merger point 50 is reached pin 52 will be in fully projected position.

Reel 10 is provided with a cover 75 which is fitted to the annular flange 21 of housing portion 17 and is held thereto by usual bayonet type slots 76 cut into its rim which slots fit about suitable projections 77 on the flange 21. This fastening arrangement permits the ready locking of cover 75 to the housing portion 17 and, of course, ready manual removal by reverse operation. Cover 75, as shown, is of generally frusto-conical configuration and has a line guide bushing 78 fixedly fitted into an opening at its apex for efficient feeding of the fishing line.

As stated above, drive shaft 53 has its inner end disposed in gear chamber 28 and carries a pinion means 54 thereon. Pinion means 54 meshes with a bevel gear 79 to be driven thereby to effect rotation of drive shaft 53 and cowl 56. Gear 79 has a recessed body 80 with a central circular opening 81 in the base 82 thereof through which extends a crank shaft 83 which is operatively positioned for rotation about an axis normal to the axis of rotation of shaft 53.

Crank shaft 83, as shown, includes a central annular portion 84 and is shaped at its inner end to provide opposite flat faces 85. Shaft 83 also has a peripheral groove 86 formed therein. At the opposite side of the annular portion 84 the shaft is threaded as at 87. Crank shaft 83 carries a crank assembly 88, which assembly includes a tubular member 89. Tubular member 89 encloses the central annular portion 84 of shaft 83 and itself is journalled within the through bore of a portion 91 of closure member 26. Tubular member 89 has a bore 92 having its inner opening 93 so shaped as to conform in outline to the flat-faced portion 85 of shaft 83. Internal shoulders within bore 92 are engageable with shoulders 94 of crank shaft 83 to restrict endwise movement of shaft 83. It is apparent that since opening 93 conforms to and mates with the flat-faced portion 85 tubular member 89 is restrained from rotative movement on shaft 83 and both, therefore, rotate in unison. Rigidly affixed to tubular member 89 is a handle 95 which is manually actuable to effect rotative movement of shaft 83 and its gear 79.

Drive gear 79 is frictionally connected for common rotative movement with shaft 83 by a brake assembly 96. Brake assembly 96 includes a pair of frictional washers 97 and 98 made of any suitable friction material such as rubber, compressed fiber, or the like. Washers 97 and 98 are disposed on opposite sides of and in the face to face engagement with the base 82 of body 80 of gear 79. Washer 97 is located within the recess of body 80 and bears against the inner face of the base 82 thereof. Also located within the recess of body 80 are a metallic washer 101 and an annular concavo-convex spring 102 with washer 101 being positioned on shaft 83 intermediate spring 102 and friction washer 97. Washer 101 and spring 102 are centrally apertured, the shape of the apertures conforming in outline to the flat-faced shaft portion 85 whereby washer 101 and spring 102 will rotate in unison with crank shaft 83.

The second friction washer 98 abuts the exterior face of gear base 82 and lies between gear 79 and a ratchet wheel 103 also carried by shaft 83. Before proceeding further with the description of the frictional connection of gear 79 to shaft 83 the purpose of wheel 103 will be described. Wheel 103 includes a series of annularly arranged peripheral teeth 104 and has a central aperture which conforms in outline to the configuration of flat-sided portion 85 of shaft 83 so that wheel 103 moves in common with shape 83. With crank assembly 88 and crank shaft 83 operatively positioned on closure member 26 the ratchet wheel 103 will be located immediately adjacent an inner surface 105 of closure member 26. Mounted for pivoted movement on this surface 105 is a generally U-shape anti-reverse latch 106 having legs 107 and 108 which lie closely disposed at either side of the ratchet wheel 103. Ratchet wheel 103 is adapted to freely rotate in one direction between the legs 107 and 108 to permit line-winding manipulation of handle 95, since the teeth 104 thereof are designed to have their sloping rear edges cam against and move legs 107 and 108 out of the path of movement. However, if handle 95 is attempted to be rotated in the reverse direction the forward edges of teeth 104 will engage stop surfaces provided by the ends of legs 107 and 108, and with such engagement any further rotative movement of the handle 95 is prevented.

The outer end of shaft 83 is threaded, as above mentioned, and carries a brake wheel or nut 109 which serves to control the application of pressure to the brake assembly. Thus, the inner end 85 of the crank shaft carries the spring 102, the metallic washer 101, the two frictional washers 97 and 98 with gear 79 therebetween, and the ratchet wheel 103 and all of these elements are disposed at the same side of inner surface 105 of closure member 26 when the crank shaft 83 and crank assembly 88 are positioned on closure member 26. The threaded end of the shaft 83 projects to the exterior side of closure member for a threaded mounting of brake nut 109. Crank handle 95 has an annular flange portion 110 which engages the outer end of portion 91 of closure member 26 to properly locate the crank assembly 88 relative to closure member 26. To hold handle 95, crank shaft 83 and the elements carried by the inner end of crank shaft 83 operatively positioned on closure member 26 there is provided a spring clip 111 which clamps within peripheral groove 86 at the interior end of crank shaft 83. With clip 111 in place the elements on the inner end of shaft 83 cannot move thereoff. Also with clip 111 in place shaft 83 cannot be moved endwise and out of the closure member 26.

Although clip 111 prevents complete endwise withdrawal of shaft 83 the length of shaft 83 is such that limited lengthwise movement is available and it is the function of brake nut 109 to effect this lengthwise movement.

When threaded onto the outer end of shaft 83, brake nut 109 will lie adjacent flange portion 110 of crank handle 95 and is adapted to bear thereagainst as it is threadedly rotated on shaft 83. Since it bears against flange portion 110, continued rotation of brake nut 109 will cause shaft 83 to move lengthwise in the direction of brake nut 109. This movement of shaft 83 will cause clip 111 to bear against spring 102 to apply spring pressure to washer 101. This pressure is transmitted through washer 101 to frictional washer 97, gear 79, frictional washer 98 and ratchet wheel 103 which is positioned adjacent the inner surface 105 of closure member 26. Thus it is apparent that this spring pressure clamps the base of gear 79 between the frictional washers 97 and 98 and clamps these three elements between metallic washer 101 and ratchet wheel 103. This clamping action serves to restrain gear 79 against free rotational movement relative to crank shaft 83, thus, as crank shaft 83 and washer 101 and ratchet wheel 103 rotate in unison, gear 79 rotates therewith to drive pinion means 54 on drive shaft 53 to effect rotation of cowl 56 in its line-winding direction. It is understood that gear 79 remains in mesh with pinion means 54 during adjustments of the brake nut 109. Thus cowl 56 may be rotated to reel in a fish by the action of handle 95, but, by reason of the use of brake assembly 96, which frictionally connects gear 79 to crank shaft 83, cowl 56 and its shaft 53 are also adapted to rotate, during play of a fish, in reverse direction against frictional restraint, even though handle 95 is being urged in line-winding direction.

It is apparent that by adjusting brake nut 109, greater or less pressure will be applied to gear 79 to increase or decrease the drag or restraint offered to cowl 56 for better play of a fish.

The present reel may also be provided with a suitable click mechanism. The click mechanism shown comprises a single length of spring wire 112 which is secured at its lower end to base 23 of housing portion 22. The free end 113 of wire 112, is formed into an arc and at its intermediate portion wire 112 is bent inwardly so that normally end 113 is biased for engagement with the teeth of spur gear 63. As gear 63 rotates, end 113 passes across the teeth of spur gear 63 to generate a clicking sound to indicate to the fisherman that the cowl 56 and its drive shaft 53 are rotating. A usual thumb button, whose shank 114 only is shown, may be provided to control the position of end 113. Shank 114 extends into the interior of housing portion 22 and click wire 112 will pass through an opening in shank 114 so that as the thumb button is pushed up shank 114 rides upwardly on the intermediate portion of wire 112 to pull end 113 away from gear 63.

It was hereinbefore described that an actuating means 45 was provided for effecting bodily movement of spool 32 to withdraw spool boss 46 from beneath bail block 66 to release pick-up pin 52, and to engage spool flange 35 with annular edge 38 of housing rim 21 to pinch the fishing line.

Actuating means 45 comprises a member 115 which, as shown, is of tong-like or generally U-shape and is formed of spring-wire. The legs 116 and 117 of tong-like member 115 have their free ends bent toward one another to form projections 118. These legs project from gear chamber 28 through spaced openings 119 provided in the base 18 of housing portion 17 to extend into the housing space which contains spool 32. The bent portions 118 of legs 116 and 117 fit into groove 44 of spool 32 at diametrically opposite points, and are normally held therewithin under the inherent resiliency of spring member 115.

Fitted around the base 121 of spring member 115 is a generally U-shape clip 122 to the legs of which is pivotally connected a link 123, this pivotal connection being effected by a pivot pin 124 which passes through an opening in the lower end of link 123. The upper end of the link 123 includes a side-wise extending bifurcated portion or jaw 125. It is also provided with a through opening 126 opposite to jaw 125. Link 123 is pivotally mounted upon housing portion 22 by fitting its opening 126 to a projection 127 located in the area of wall opening 25. An actuating lever 128 is carried by reel 10 exteriorly of housing portion 22, being pivotally connected at one of its ends by a pin 129 to an external boss 131 of the housing. The actuating lever 128 is, as shown, of generally arcuate shape and is located in position for ready manipulation by the thumb of the fisherman.

From the underside of actuating lever 128 there depends a pair of spaced apart legs 132 which pass through opening 25 of housing portions 22 to fit about jaw 125 of link 123. Legs 132 are provided with the apertures 133 with aperture in one of the legs being internally threaded. Apertures 133 align with the slot of jaw 125 whereby a headless screw 134 may be fitted into the internally threaded aperture and extend through the slot and the other aperture to effect a sliding pivotal connection between link 123 and lever 128.

Upon the application of thumb pressure to actuating lever 128 force will be applied through depending legs 132 to the jaw of link 123 to rotate it upon housing projection 127. The rotation of link 123 will cause a pull to be applied to clip 122, which pull is transmitted through legs 116 and 117 of tong 115 to spool 32 to draw spool 32 against the bias of core spring 41 toward base 18 of housing portion 17 to effect pinching of the fishing line and to drop bail pin 52 to inoperative position. When thumb pressure is removed from actuating lever 128, coil spring 41 exerts its bias to move spool 32 to its normal position. This force of spring 41 is transmitted through legs 116 and 117 of tong 115 to return link 123 and actuating lever 128 to their normal position.

The operation of the present reel will now be described. It will be assumed that the parts of the reel are in rewinding position, as shown in FIGURE 3, and it is desired to cast. In preparing the reel for casting, the fisherman will place his thumb upon actuating lever 128 and press it downwardly. This will cause link 123 to pivot and apply a pull on tong 115, which pull works through legs 116 and 117 of tong 115 to draw spool 32 into housing portion 17 to pinch the fishing line between spool flange 36 and housing rim 21. Also since boss 46 of spool 32 is displaced from beneath bail block 66, the latter drops downwardly to withdraw pick-up pin 52 into its aperture 72. The fishing line, thus, is prevented from feeding off of spool 32.

As the fisherman makes his casting movement he removes his thumb from actuating lever 128 which allows spool 32 to move outwardly under the bias of its spring 41 thereby freeing the line from the clamping force of spool flange 36. The line being free will unwind from the stationary spool 32 under the pull of the fishing lure at the end of the line. Pick-up pin 52 remains in retracted position during the cast and affords no interference to the free flow of the line from the spool. Conical cover 75 prevents the line from spiraling as it feeds from the spool and keeps it free of the rod. Should the fisherman decide to halt the lure in flight he merely thumbs actuating lever 128 and further feeding of the line is stopped by spool flange 36 engaging rim 21 and the lure will fall. Thus the fisherman may control the distance of his cast.

When the rewinding is desired, the fisherman applies no pressure to actuating lever 128 but rather begins turning of the handle 95. Rotation of handle 95 will, through gear 79 and pinion means 54, effect rotation of cowl 56. Bail-block 66 now will ride on camming run 49 provided by spool boss 46 until it moves back atop spool boss 46 at which time pick-up pin 52 will be projected to the exterior of cowl 56. Pin 52, in its extended position, will on continued rotation of handle 95 engage the fishing line and will wind it upon the spool 32. Rotation is continued, of course, until the line is re-wound to a desired amount on the spool.

It is noted that brake nut 109 is positioned convenient to the fisherman's hand which rewinds the reel so that during play of a fish he may selectively vary the tension on the fishing line simply by rotation of the brake nut 109 in the proper direction to increase or decrease the frictional force of the brake or overload assembly 96.

The construction afforded the present reel permits ready replacement of the spool in the field should a different weight line be desired or for any other reason. To replace a spool, it is necessary only to remove cover 75, manually unthread cowl 56 from shaft 53 and then pull on the spool 32 to force it from the resilient grasp of legs 116 and 117 of tong 115 and off of tubular shaft 31. The new spool is then pushed on shaft 31 and against the legs 116 and 117 to spread them apart until the projections 118 thereof fall into the groove 44 of the spool to establish the connection between the spool and the actuating assembly 45. The cowl 56 and cover 75 are thereafter replaced.

While a certain preferred embodiment of the invention has been specifically disclosed, it is understood that the invention is not limited thereto as many variations will be readily apparent to those skilled in the art and the invention is to be given its broadest possible interpretation within the terms of the following claims.

What I claim is:

1. A spinning type casting reel comprising a housing having a base and a wall portion, a stationary supporting member carried by said housing, a non-rotative line-carrying spool slidably positioned on said supporting member for movement relative to said wall portion, said spool comprising a hub upon which a fishing line is adapted to be wound and a pair of opposed end flanges, one of said end flanges being adapted to be moved into engagement with said housing wall portion, a drive shaft projecting through said base, a line-winding member rotatably carried by said drive shaft in concentric relation to said spool for engaging and winding a line onto said spool on rotation of said line-winding member, means for rotating said drive shaft to rotate said line-winding member, manually operable means for slidably moving said spool in the direction of the wall portion of the housing to engage said one end flange thereof with said wall portion of said housing to clamp the line therebetween, and spring means operable on said spool for returning said spool to normal position free of said wall portion on release of said manually operable member.

2. A spinning type casting reel comprising a housing having a base and an annular wall, a stationary supporting member carried by said base, a non-rotative line-carrying spool slidably positioned on said supporting member, a drive shaft projecting through said base, a line-winding member rotatably carried by said drive shaft in concentric relation to said spool for engaging and winding a line onto said spool on rotation of said line-winding member, means for rotating said drive shaft to rotate said line-winding member, said spool having a hub upon which a fishing line is adapted to be wound and a front and a rear flange in opposed relationship with said rear flange being movable in the space defined by said annular wall and with said front flange being movable into engagement with said annular wall to clamp the fishing line therebetween, spring means operable on said spool for normally positioning its front flange free of said wall, and manually operable means for slidably moving said spool in the direction of said housing wall against the bias of said spring means to effect engagement of said front spool flange with said housing wall.

3. A spinning type casting reel comprising a housing having a base and a wall portion, a non-rotative line-carrying spool supported for rectilinear movement on said base, a line-winding member rotatably positioned in concentric relation to said spool for engaging and winding a line onto said spool on rotation of said line-winding member, means for rotating said line-winding member, said spool having a flange movable upon movement of said spool in the direction of said housing wall portion to engage with said housing wall portion to clamp the line therebetween, spring means operable on said spool for normally positioning its flange free of said wall portion, and manually operable means for slidably moving said spool against the bias of said spring means to effect engagement of said spool flange with said housing wall portion.

4. A spinning type casting reel comprising a housing having a base and a wall portion, a non-rotative line-carrying spool supported for rectilinear movement on said base, a line-winding member rotatably positioned in concentric relation to said spool for engaging and winding a line onto said spool on rotation of said line-winding member, means for rotating said line-winding member, said spool having a flange movable upon movement of said spool in the direction of said housing wall portion to engage with said housing wall portion to clamp the line therebetween, spring means operable on said spool for normally positioning its flange free of said wall portion, and manually operable means for slidably moving said spool against the bias of said spring means to effect engagement of said spool flange with said housing wall portion, said manually operable means comprising a retracting member having a connection with said spool and a hand operated member interconnected with said retracting member for moving it to move said spool into its line clamping position.

5. A spinning type casting reel comprising a housing having a base and a wall portion, a non-rotative line-carrying spool supported for rectilinear movement on said base, a line-winding member rotatably positioned in concentric relation to said spool for engaging and winding a line onto said spool on rotation of said line-winding member, means for rotating said line-winding member, said spool having a hub upon which a fishing line is adapted to be wound and a pair of opposed end flanges with one of said flanges being adapted upon movement of said spool in the direction of said housing wall portion to engage with said housing wall portion to clamp the line therebetween, spring means operable on said spool for normally positioning said one flange free of said wall portion, and manually operable means for slidably moving said spool against the bias of said spring means to effect engagement of said spool flange with said housing wall portion, said manually operable means comprising a rectilinearly movable resilient retracting member having a releasable connection with said spool, a link member pivotally supported on a housing portion and being connected to said retracting member, and a thumb operated actuating lever pivotally supported on said housing portion and having a connection with said link member for actuation thereof to move said retracting member and said spool.

6. A spinning type casting reel comprising a housing having a base and an annular wall, a stationary supporting member carried by said base, a non-rotative line-carrying spool slidably positioned on said supporting member, a drive shaft projecting through said base, a line-winding member rotatably carried by said drive shaft in concentric relation to said spool for engaging and winding a line onto said spool on rotation of said line-winding member, means for rotating said drive shaft to rotate said line-winding member, said spool having a hub upon which a fishing line is adapted to be wound and a front and a rear flange in opposed relationship with said rear flange being movable in the space defined by said annular wall and with said front flange being movable into engagement with said annular wall to clamp the fishing line therebetween, spring means operable on said spool for normally positioning its front flange free of said wall, and manually operable means for slidably moving said spool in the direction of said housing wall against the bias of said spring means to effect engagement of said front spool flange with said housing wall, said manually operable means comprising a rectilinearly movable resilient retracting member having a pair of leg portions extending through said base for releasable connection with a groove provided at the rear face of said spool, a link member pivotally supported on a housing portion and having a pivotal connection with said retracting member, and a thumb operated actuating lever pivotally supported on said housing portion and having a connection with said link member for actuation thereof to move said retracting member and said spool.

7. A spinning type casting reel comprising a housing having a base and an annular wall, a stationery supporting member carried by said base, a non-rotative line-carrying spool slidably positioned on said supporting member, a drive shaft projecting through said base, a line-winding member rotatably carried by said drive shaft in concentric relation to said spool for winding a line onto said spool on rotation of said line-winding member, means for rotating said drive shaft to rotate said line-winding member, said spool having a hub upon which a fishing line is adapted to be wound and a front and a rear flange in opposed relationship with said rear flange being movable in the space defined by said annular wall and with said front flange being movable into engagement with said annular wall to clamp the fishing line therebetween, spring means operable on said spool for normally positioning its front flange free of said wall, said line-winding member having an annular base and an annular peripheral flange, a pick-up pin radially projectible through an aperture in said peripheral flange to engage and wind a line on the spool on rotation of said line-winding member, a mounting member for said pick-up pin slidably supported on said annular base of said winding member, a projection on said spool positionable under and in engagement with the lower end of said mounting member for locating said pick-up pin in projected position, manually operable actuating means connected to said spool in the direction of said housing wall for slidably moving said spool against the bias of said spring means to effect engagement of said front flange with said housing wall, said movement of said spool simultaneously withdrawing said spool projection from engagement with said mounting member, a spring means acting on said mounting member and operable on withdrawal of said spool projection to move said pick-up pin within its associated aperture to inoperative position, and camming means on said spool projection engageable by the lower end of said mounting member to return it to its position atop the spool projection and thereby return the pick-up pin to its projected position on rotation of said line-winding member.

References Cited in the file of this patent

UNITED STATES PATENTS

| 2,136,438 | Horsrud | Nov. 15, 1938 |
| 2,643,073 | Bourne et al. | June 23, 1953 |
| 2,828,088 | Denison | Mar. 25, 1958 |
| 2,862,679 | Denison | Dec. 2, 1958 |

FOREIGN PATENTS

| 1,110,429 | France | Oct. 12, 1955 |